April 12, 1960 K. R. HALES ET AL 2,932,684
SEMI-CONDUCTOR UNITS AND METHODS OF MAKING THEM
Filed Sept. 10, 1956 2 Sheets-Sheet 1

INVENTORS
KENNETH R. HALES
HARRY E. GODSHALL
BY
AGENT

April 12, 1960 K. R. HALES ET AL 2,932,684
SEMI-CONDUCTOR UNITS AND METHODS OF MAKING THEM
Filed Sept. 10, 1956 2 Sheets-Sheet 2

INVENTORS
KENNETH R. HALES
HARRY E. GODSHALL
BY

AGENT

United States Patent Office 2,932,684
Patented Apr. 12, 1960

2,932,684

SEMI-CONDUCTOR UNITS AND METHODS OF MAKING THEM

Kenneth R. Hales, Colmar, and Harry E. Godshall, Lansdale, Pa., assignors to Philco Corporation, Philadelphia, Pa., a corporation of Pennsylvania Application September 10, 1956, Serial No. 608,791

2 Claims. (Cl. 174—50.5)

This invention pertains to semi-conductor units, mainly of the power transistor type, and provides improved forms and methods of encapsulation for such units. More particularly this is an improvement over the invention disclosed by R. T. Vaughan in his copending application Serial No. 606,818, filed August 29, 1956, and assigned to the assignee of this invention.

As explained in said Vaughan application, it is frequently desirable or necessary to encapsulate a transistor in a metal capsule, filled with dry gas and hermetically enclosing the transistor, and such a capsule is most efficiently made by (1) forming the support for the transistor as a slug of high heat conductivity metal, such as copper, with a generally flat but specially profiled surface, having a groove in its outer part and having a flange, extending outwardly from the top of the outer wall of the groove, and by (2) joining a matching flange of a metallic cap to the flange of the slug, using in this joining operation a cold metal working technique which causes unobstructed, lateral flows of cold, solid metal. These lateral flows include an inward flow of metal, which is allowed by the provision of said groove. There results the formation of a thin, homogeneous, cold-worked flange structure which generally provides a hermetic seal and affords strong and desirable protection for the transistor or other semiconductor.

While significant improvements in power transistor capsules and the like were obtained by the technique as briefly described, it was found possible to improve these capsules further; and it is the basic object of our invention to provide such further improvement.

Another object is to improve the encapsulation mechanically, with particular respect to strength against forces tending to distort certain parts and impair their function.

Another important object is to improve the encapsulation physically, with particular respect to strength against forces tending to cause contamination of the completed unit. In this latter respect, much is presently obscure both as to the exact details of the contaminating agencies and as to the exact mechanism whereby such agencies may penetrate through a seemingly solid metal wall. However, we have definitely found that such penetration of harmful agencies can be minimized, or practically eliminated by certain changes applied to the sealing wall provided by said Vaughan invention, which wall included a substantially flat, cold-worked flange structure.

The objects have been achieved by means of new procedural features, a preferred form of which includes the application of extremely high metal intermingling pressures to a pair of concentric annular flange zones and the application of relatively lower pressure to an intermediate flange zone, thereby forming a kind of corrugation in a flange structure, instead of the flat structure of the Vaughan invention. The more detailed features of this new technique and of apparatus which can be provided thereby will be described hereinafter and reference will be made to the drawing, wherein.

Figures 1, 2:
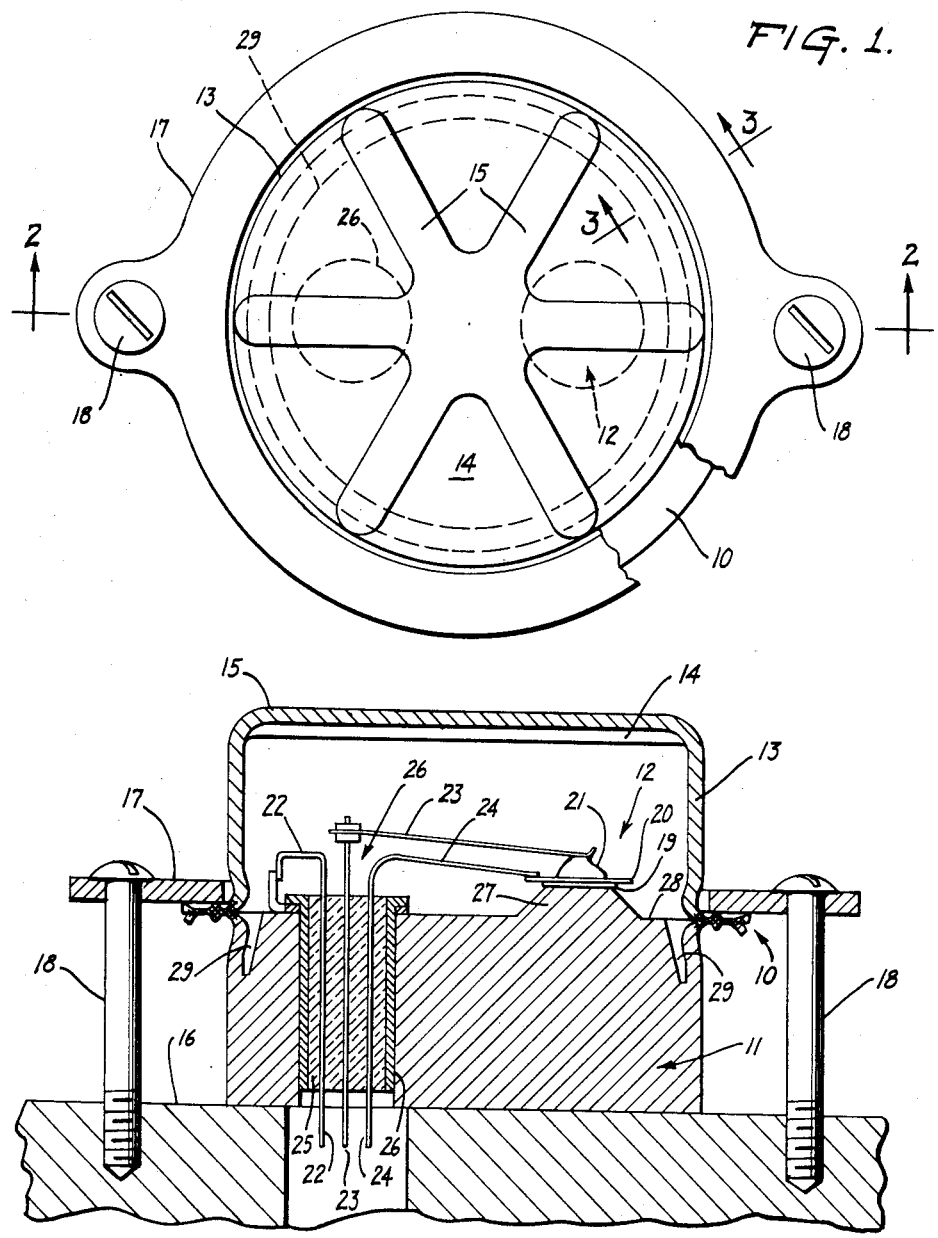
Figure 1 is an enlarged plan view of a typical semiconductor unit incorporating the present invention.
Figure 2 is a transverse section of said unit, mounted on a heat sink support, the section being taken along line 2—2 in Figure 1.

Referring first to Figures 1 and 2: a flange structure 10 surrounds a metallic, supporting block or base slug 11 for a power transistor 12. This flange structure joins the periphery of the slug 11 to the wall 13 of an overlying cap, hat or encasing member 14. The cap may be reinforced by integral, radial ribs 15.

Before the structural features of the new flange structure 10 are pointed out, reference may be made to the construction of a power transistor, including the metallic support and heat sink element 16 whereto the metallic slug 11 is thermally coupled. The slug is mechanically held to this element by a clamp ring 17, shown in Figure 2 as bearing down on the flange structure 10 and as being connected with the support 16 by screws 18. The heat sink serves to dissipate the heat generated in the transistor and mainly in the collector element 19 thereof.

Any suitable construction of the collector 19 and of the transistor or other semi-conductor in general can be used. The collector is here shown as supporting a base element 20, with an emitter element 21 thereon; and the unit 12 may, like other transistors, have collector, emitter and base lead wires 22, 23 and 24 which may pass through an insulating glass bead 25, surrounded by and hermetically sealed to a metal sleeve 26, the sleeve being inserted in the metal slug 11 to form a stem surrounded by the flange structure 10. For known reasons which need not be explained herein, the lead wires 22, 23, 24 usually are thin and flexible. As a result they are inadequate to remove the relatively large amounts of heat produced in the operation of the power transistor, contrasting in this respect with the similar wires of low-energy transistors. In order to provide sufficient conductance for the heat, generated in the present high-energy unit, the collector element 19 is mechanically secured to and held in surface contact with a broad, integral, desirably projecting boss 27 on the top surface 28 of the metal slug 11; the area of surface contact 19—27 being of the same order of size as, and concentric with, the collector junction 19—20 and this junction being disposed in close proximity to and thermal coupling with the high heat conductivity metal of the boss 27, whereby it is effectively coupled with the heat sink 16.

Figure 3:
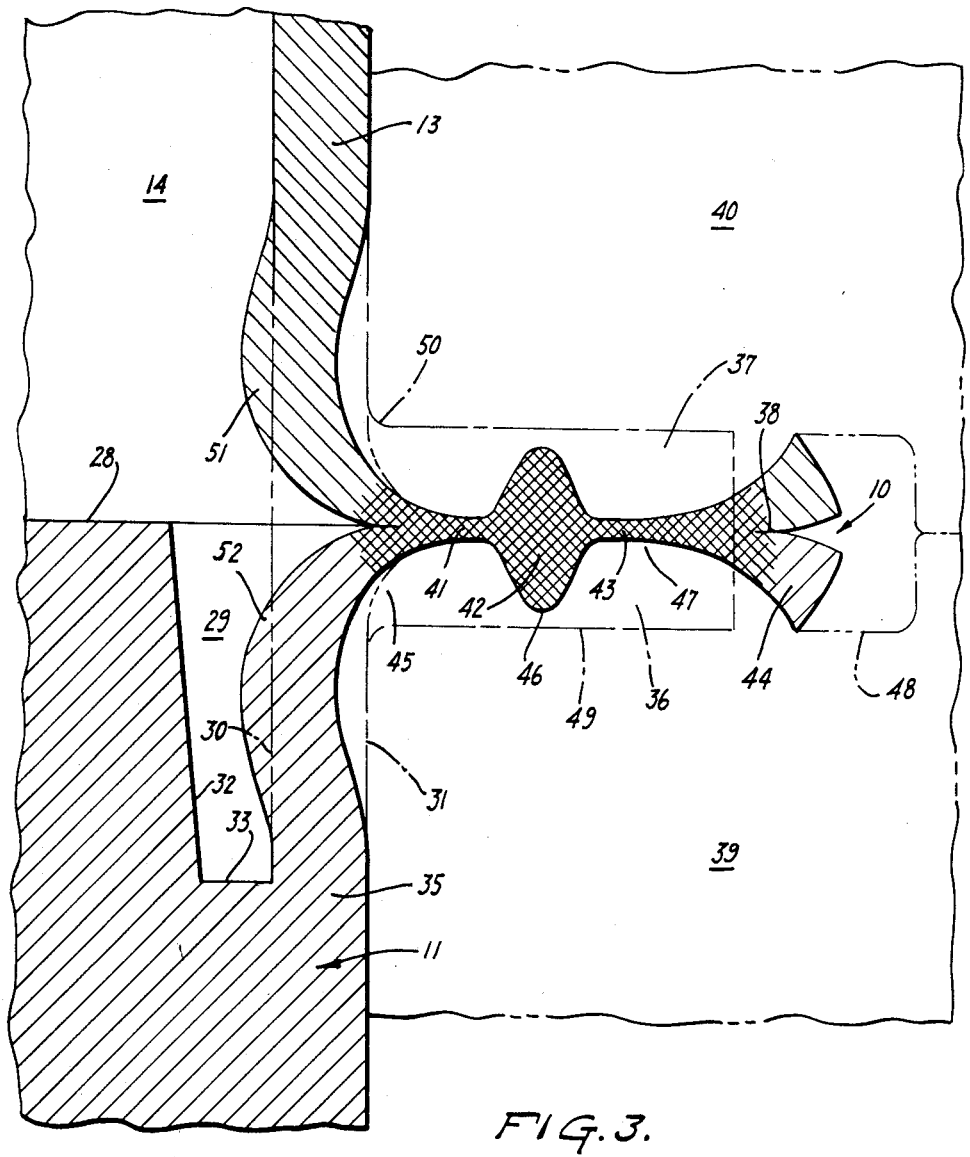
Figure 3 is an additionally enlarged detail, shown in a view similar to that of Figure 2, showing the unit at completion of the fabricating procedure and prior to its being mounted on the heat sink support.

In accordance with the R. T. Vaughan invention the solid metal of slug 11 is hollowed out adjacent to and concentrically with the periphery of the top surface 28. For instance, an annular groove 29 may be machined into the metal of the slug. Such a groove or hollowed-out portion, as shown, surrounds the stem 26, boss 27 and transistor 12. As best shown in Figure 3, such a groove may be machined with an original, outer, cylindrical wall surface 30, parallel to a similar, original wall surface 31 of the slug 11, whereas an inside wall surface 32 of the groove may be frusto-conically inclined to form a generally V-shaped groove. Groove surfaces 30, 32 may be joined by a bottom 33. The thickness of the metal wall 35, on the outside of the groove, is of the same order of magnitude as that of the wall 13 of the cap 14.

Outwardly extending flanges 36, 37 are originally provided on the metal slug 11 and cap 14, as shown by broken lines in Figure 3; and these flanges may be approximately as thick as the walls 35 and 13. Both flanges, as well as the slug 11 and cap 14, are desirably made of copper. Figure 3 shows only a part 38 of the original top surface of the lower flange 36, in order not to confuse the disclosure of the completed structure, wherein this surface largely disappears, as will be explained presently. This entire flange surface, as originally formed, may desirably be flat and disposed on the same level with the flat surface 28 of the slug; in addition it is important that this surface be meticulously cleaned and kept free of impurities, such as dust and oxide films.

In the sealing operation according to this invention the original flanges are squeezed together under extremely high, localized pressures.

These pressures, provided by machinery not shown, may be transmitted to the original flanges 36, 37 by a pair of narrow annular jaw members 39, 40, shown in Figure 3 by broken phantom lines different from those denoting the original flanges. The jaws may be made of steel or the like. They have particular cross-sectional contours; that is, as clearly shown in Figure 3, they are shaped so as to make the flange structure of the completed unit much thinner, vertically, and at least somewhat wider, horizontally, than the original flanges 36, 37, and to give the completed flange structure a cross-section of outwardly varying thickness. Said cross-section provides, concentrically: an innermost ring portion 41 directly contiguous to the walls 13 and 35 and having minimum thickness; a next outer ring portion 42 of a thickness substantially greater than that of ring 41 but still appreciably smaller than the combined thicknesses of the original flanges 36, 37; a next following ring portion 43 having approximately the same minute thickness as portion 41; and an outermost portion 44 which again has greater thickness. Typical, actual metal thicknesses, successfully used in certain applications of this invention, are approximately: .015 inch for each wall 13, 35, 36, 37; .018 inch for ring 42; and down to about .004 inch for each ring 41, 42 (about 15 percent of the original thickness of two times .015 inch).

Correspondingly, the jaw members 39, 40 have innermost upstanding ridges 45, surrounded by grooves 46, outer ridges 47 and outermost grooves 48; the latter grooves forming a large cavity of non-critical form whereas the inner grooves and ridges form a compound cavity of relatively critical form, defining and matching the aforementioned ring portions 41 to 44 of the completed flange structure 10.

At the start of the sealing operation, the ridges 45, 47 contact the outer surfaces 49, 50 of the original flanges 36, 37, in two concentric pairs of coaxial, annular contact areas, one area of each pair directly confronting the other. As the cold-working proceeds, a maximum degree of deformation of metal occurs in the vicinity of these ridges. As a result metal tends to flow inwardly and outwardly away from said pair of ridges. As in the R. T. Vaughan invention the metal flows remain practically cold, at least on all exposed surfaces; there occurs no release of metal vapor and preferably not even any melting and there is no consequent harm to the transistor 12.

The described cold metal flows induce an intimate intermingling and associated deformation of metal particles forming part of the original flanges 36, 37; and the microstructure of the pressure-affected parts of the flange zone 10, formed in accordance with this invention, may be clearly and readily recognized by persons skilled in the art as being a structure of the type known as metal mingled by a particular and extremely forcible application of cold-working. Metallic flow lines are recognizable in a suitably prepared cross-section of this structure, after the completion of the cold-working process; they merge in the relatively thin zones 41, 43 and diverge in the relatively heavier zone 42. No cracks or areas affected by porosity are visible under the highest, microscopic magnifications available.

Practically complete hermetic exclusion of humidity and of other contaminants is achieved by the described process and particularly by the provision of the relatively heavy section 42 between the relatively thin sections 41, 43. The advantageous effect of this feature has been observed in actual practice; and while we do not want to be bound to any particular theory, we may explain the feature as follows.

In the first place a purely mechanical reinforcement is provided by the bead or ring 42 for the thin and therefore vulnerable rings 41, 43. This strengthening is quite important as it provides a shielding effect during the necessary handling of the capsule in the completion of the fabricating process and in the subsequent assembly and general use of the unit, including for instance the application of mechanical forces by the mounting ring 17 which tends to deform the outer part of the flange structure 10 (see Figure 2).

A further advantage of the bead 42 (Figure 3) is that it allows making the extremely thin rings 41, 43 relatively narrow, thereby avoiding undue weakness of the most attenuated structure, while still providing full, hermetical sealing. This sealing seems to occur in more or less the same way as in the R. T. Vaughan invention, that is, it seems to occur incident to outward and inward metal flows of cold metal, the inward flows causing an unobstructed inward spreading or bending of terminal parts of the walls 13 and 35 into the groove 29 and the overlying space, as shown at 51, 52. This results in efficient sealing of the flange area 10, without a disturbing tendency to produce "feathering" or local shear failures extending into or across the seal.

Some shearing effects and some minute, incipient feathering—invisible under the microscope when observing a suitably prepared section of the flange structure 10 but nevertheless potentially leading to serious, gradual contamination of the semi-conductor—may be more or less inherent in the metal mingling procedure; but while such shearing actually may occur in minute edge portions of the narrow rings 41, 43, a sound, hermetic seal is nevertheless provided, by the use of the relatively large groove 46 and the relatively thicker ring section 42 formed therein, in conjunction with either a single thin section 41 or a pair of thin section 41, 42. It seems that the uniformity of the mingling of metal flows is enhanced by the partial relief of the cold-working pressure, given in the relatively wider area 42. This is surprising, since in other processes involving a plastic flow of solid material, reduced rather than enhanced mingling usually is expected, when such a relief area is used.

We have established the fact that the use of the mutually facing groove portions 46 between the inner and outer relief spaces 29, 48, allows us to eliminate even such minute, submicroscopic passageways in the metal of the flange joint structure as must be expected in case of any serious feathering. Thus the present technique, while fully avoiding the release of noxious vapors, provides improved protection against the gradual entrance even of mere molecules of humidity and the like.

A variety of other metal-working procedures, some of them quite expensive, are used in fields somewhat comparable to that of transistor encapsulation, for instance in the fabrication of metallic closures for high-vacuum tubes. However, none of those prior methods can be compared, in overall effectiveness, with the relatively simple and inexpensive procedure described above, for the encapsulation of metal-mounted semi-conductors.

While only one form of the new method and one product thereof have been described, it should be understood that the details thereof are not to be construed as limitative of the invention, except insofar as set forth in the following claims.

We claim:

1. A semiconductor encapsulating device comprising first and second housing members, said members having, respectively, first and second metallic flanges outwardly extending therefrom, one overlying the other and joined thereto to enclose a semiconductor body between the housing members, the joined flanges having metal constituents of the first flange intermingled with metal constituents of the second flange in and throughout the width of a junction zone which zone consists of a generally annular strip and a generally annular bead, disposed in concentrically adjacent relationship, said bead being formed by compressing portions of the two overlying flanges so as at least somewhat to reduce the original thickness thereof, and said strip being formed by compressing portions of said two flanges, concentrically adjacent the portion first mentioned, to reduce the original thickness of said second mentioned portions very considerably more than the reduction effected in said portions first mentioned.

2. A semiconductor encapsulation device comprising a pair of housing members enclosing a semiconductor body therebetween, said housing members having outwardly extending flanges, one overlying the other and joined thereto, the joined flanges having metal constituents of both flanges intermingled in and throughout the width of a junction zone which zone consists of a generally annular strip, a generally annular bead and another generally annular strip, said strips and bead being disposed in concentrically adjacent relationship with the bead disposed between the strips, said bead being formed by compressing portions of the two overlying flanges so as at least somewhat to reduce the original thickness thereof, and both of said strips being formed by compressing portions of the two flanges concentrically adjacent the portions first mentioned to reduce the original thickness of said second mentioned portions very considerably more than the reduction effected in said portions first mentioned.

References Cited in the file of this patent

UNITED STATES PATENTS

| | | |
|---|---|---|
| 2,156,324 | Welwood | May 2, 1939 |
| 2,170,695 | Pike | Aug. 22, 1939 |
| 2,608,887 | Sowter | Sept. 2, 1952 |
| 2,697,954 | Sowter | Dec. 28, 1954 |
| 2,703,997 | Sowter | Mar. 15, 1955 |
| 2,736,090 | Sowter et al. | Feb. 28, 1956 |
| 2,777,974 | Brattain et al. | Jan. 15, 1957 |
| 2,808,543 | Cooper | Oct. 1, 1957 |
| 2,819,884 | Rieppel et al. | Jan. 14, 1958 |
| 2,854,610 | Waters et al. | Sept. 30, 1958 |

FOREIGN PATENTS

| | | |
|---|---|---|
| 1,088,170 | France | Sept. 8, 1954 |
| 768,103 | Great Britain | Feb. 13, 1957 |

UNITED STATES PATENT OFFICE

CERTIFICATE OF CORRECTION

Patent No. 2,932,684                  April 12, 1960

Kenneth R. Hales et al.

It is hereby certified that error appears in the printed specification of the above numbered patent requiring correction and that the said Letters Patent should read as corrected below.

Column 5, line 13, for "portion" read -- portions --.

Signed and sealed this 1st day of November 1960.

(SEAL)
Attest:

KARL H. AXLINE
Attesting Officer

ROBERT C. WATSON
Commissioner of Patents